(12) United States Patent
de la Guardia et al.

(10) Patent No.: US 7,711,659 B2
(45) Date of Patent: May 4, 2010

(54) ADAPTIVE SYSTEM FOR FAN MANAGEMENT

(75) Inventors: Rafael de la Guardia, Guadalajara (MX); Willem M. Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 11/646,977

(22) Filed: Dec. 28, 2006

(65) Prior Publication Data

US 2008/0162388 A1    Jul. 3, 2008

(51) Int. Cl.
*G06F 15/18* (2006.01)
(52) U.S. Cl. .......................................... 706/1
(58) Field of Classification Search ............ 706/1
See application file for complete search history.

(56) References Cited

U.S. PATENT DOCUMENTS

| | | | | |
|---|---|---|---|---|
| 5,822,740 | A * | 10/1998 | Haissig et al. | 706/3 |
| 6,720,756 | B2 * | 4/2004 | Skinner et al. | 324/71.1 |
| 6,906,923 | B2 * | 6/2005 | Lofland et al. | 361/704 |
| 7,269,008 | B2 * | 9/2007 | Mongia et al. | 361/689 |
| 7,386,354 | B2 * | 6/2008 | Yasui | 700/29 |
| 7,490,479 | B2 * | 2/2009 | Byquist et al. | 62/178 |

OTHER PUBLICATIONS

Combined method of uncertain measurement fusion, Cen Ming; Liu Xingfa; Fu Chengyu; Control and Decision Conference, 2008. CCDC 2008. Chinese Jul. 2-4, 2008 pp. 1584-1587 Digital Object Identifier 10.1109/CCDC.2008.4597584.*

"Advanced Configuration and Power Interface Specification", Revision 3.0a, Dec. 30, 2005, Hewlett-Packard Corporation, Intel Corporation, Microsoft Corporation, Phoenix Technologies Ltd., Toshiba Corporation. 624pgs.

Chuen Chien Lee, "Fuzzy Logic in Control Systems: Fuzzy Logic Controller, Part I", IEEE Transactions on Systems, Man, and Cybernetics, vol. 20, No. 2, Mar./Apr. 1990, 0018-9472, © 1990 IEEE. pp. 404-418.

"LM96000 Hardware Monitor with Integrated Fan Control", Nov. 2004, © 2004 National Semi conductor Corporation; DS200846, www.national.com. 28pgs.

Athas, William et al., "Compast Models for Estimating Microprocessor Frequency and Power", ISLPED'02, Aug. 12-14, 2002, Monterey, California. Copyright 2002 ACM 1-58113-475-4. pp. 313-318.

Kevin Skadron et al., "Temperature-Aware Microarchitecture: Modeling and Implementation", ACM Transactions on Architecture and Code Optimization, vol. 1, No. 1, Mar. 2004, pp. 94-125. © 2004 ACM 1544-3566.

(Continued)

*Primary Examiner*—Michael B Holmes
(74) *Attorney, Agent, or Firm*—Buckley, Maschoff & Talwalkar LLC

(57) ABSTRACT

A system may include construction of observation vectors based on a plurality of power samples indicating past power consumption of a device and a plurality of temperature samples indicating past temperatures of the device, determination of an estimated temperature of the device based on fuzzy reasoning models comprising the observation vectors and a fan control parameter vector; measurement of a temperature of the device, determination of an error based on the estimated temperature and the measured temperature, and adaptation of the fan control parameter vector using a recursive least squares algorithm based on the error. The fans may be controlled based on the fan control parameter vector.

19 Claims, 4 Drawing Sheets

OTHER PUBLICATIONS

W. L. Bircher et al., "Runtime Identification of Microprocessor Energy Saving Opportunities", *ISLPED'05*, Aug. 8-10, 2005, San Diego, CA. Copyright 2005 AMC 1-59593-137-6. pp. 275-280.

Eric C. Samson et al., "Interface Material Selection and a Thermal Management Technique in Second-Generation Platforms Built on Intel® Centrino™ Mobile Technology", Intel® Technology Journal, vol. 9, Issue 1, 2005. pp. 75-86.

L.F. Mendonca et al., "Optimization problems in multivariable fuzzy predictive control", International Journal of Approximate Reasoning 36 (2004). pp. 199-221. www.elsevier.com/locate/ijar.

Chuen Chien Lee, "Fuzzy Logic in Control Systems: Fuzzy Logic Controller, Part II", IEEE Transactions on Systems, Man, and Cybernetics, vol. 20, No. 2, Mar./Apr. 1990, 0018-9472, © 1990 IEEE. pp. 419-435.

Tao Li et al., "Run-time Modeling and Estimation of Operating System Power Consumption", *SIGMETRICS'03*, Jun. 10-14, 2003, San Diego, CA. Copyright 2003 ACM 1-58113-664-1. pp. 160-171.

Ming He et al., "Multiple fuzzy model-based temperature predictive control for HVAC systems", Information Sciences 169 (2005) pp. 155-175. www.elsevier.com/locate/ijar.

Gilberto Contreras et al., "Power Prediction for Intel XScale® Processors Using Performance Monitoring Unit Events", *ISLPED'05*, Aug. 8-10, 2005, San Diego, CA. Copyright 2005 ACM 1-59593-137-6. pp. 221-226.

Pu Liu et al., "Fast Thermal Simulation for Architecture Level Dynamic Thermal Management", 0-7803-9254-X. © 2005 IEEE. pp. 638-643.

SMSC™ Success by Design, "Fan Control Device with High Frequency PWM Support and Hardware Monitoring Features", EMC6D103, Datasheet, Revision 0.4 (Apr. 4, 2005). pp. 1-89.

Hien Pham, "Preparing for Advanced Fan Speed Control (AFSC)", Intel Developer Forum, Intel® Leap ahead™, 22pgs.

Tod Byquist and Nick Weber, "Advanced Fan Speed Control Tuning Lab", Intel Developer Forum, Intel® Leap ahead™, 33pg.

\* cited by examiner

ADAPTIVE SYSTEM FOR FAN MANAGEMENT

BACKGROUND

Conventional computing platforms use fan speed algorithms and stored parameters to control platform fans based on component temperatures. FIG. 1 illustrates a conventional Advanced Fan Speed Control architecture 100 for controlling fans based on a degree of thermal influence of each fan on a platform component or zone. Specifically, weighting matrix 110 provides influence coefficients indicating the relative influence of fans F1 and F2 on temperatures detected by temperature sensors T1 and T2. ΔPWM boxes 120 and 130 generate a control action associated with each sensor using a PID (i.e., Proportional+Integral+Derivative) law. A PWM signal for each fan is then generated by multiplying the control action by a corresponding influence coefficient.

The parameters of weighting matrix 110 are determined and stored by a system integrator based on typical system configuration, usage and placement. The parameters are therefore not efficient for environmental conditions to either extreme of the typical conditions. The static set of parameters may therefore lead to thermal guard bands and suboptimal performance.

DETAILED DESCRIPTION

Figure 2:
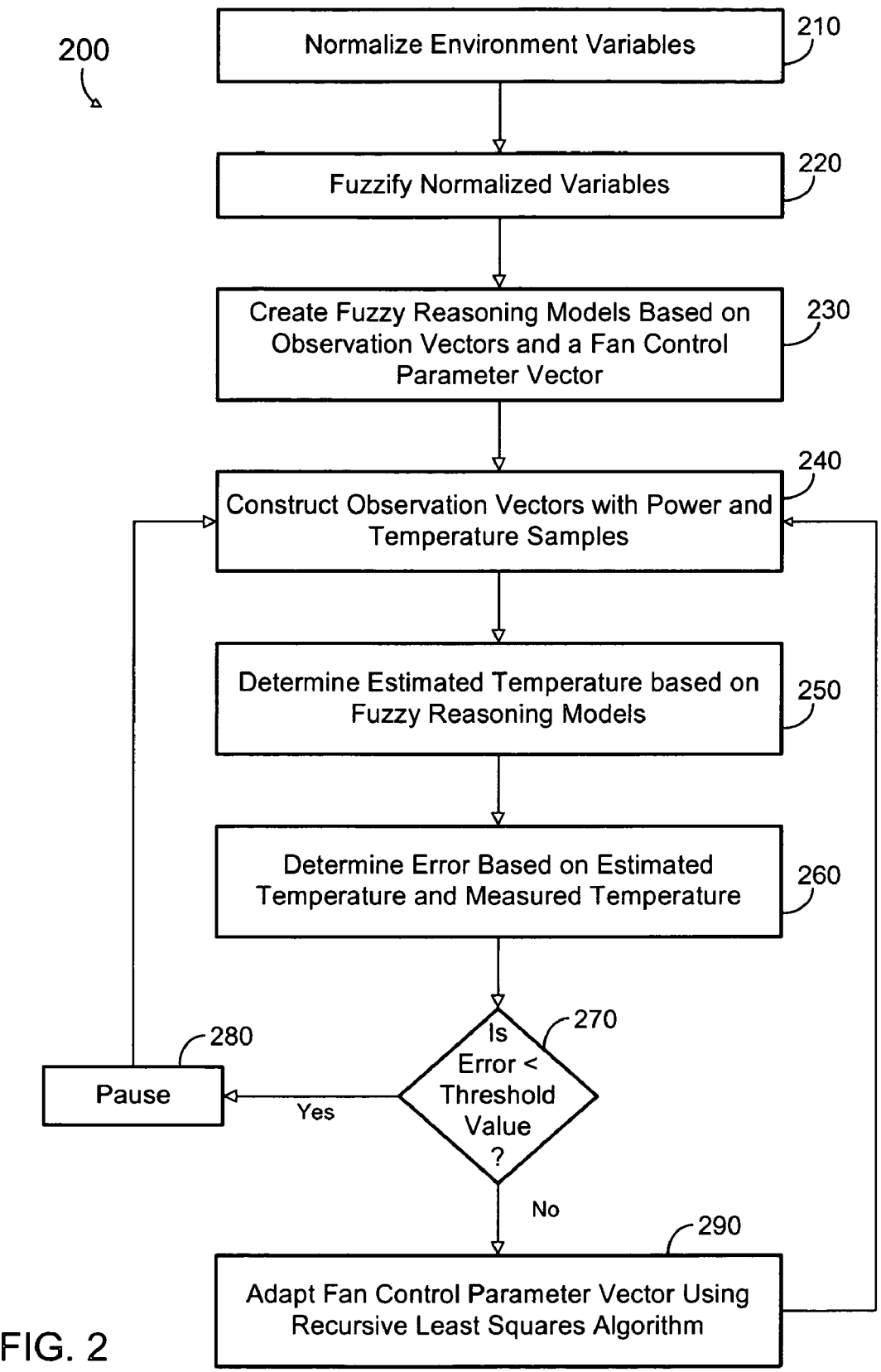
FIG. 2 is a flow diagram of a process according to some embodiments.

FIG. 2 is a diagram of process 200 according to some embodiments. Process 200 may be executed by any combination of hardware, software and/or firmware, and some elements may be executed manually.

Initially, environmental variables are normalized at 210. The environmental variables may comprise any variables which may affect the temperature of an electronic device whose temperature is to be managed, including but not limited to fan speed, ambient temperature, and airflow velocity. In a specific example of 210, the environmental variables $X_1$ and $X_2$ represent the respective speeds of two platform fans. The normalized variables may therefore be represented as:

$$x_1 = (X_1 - X_{1,min})/(X_{1,max} - X_{1,min}), \text{ and}$$

$$x_2 = (X_2 - X_{2,min})/(X_{2,max} - X_{2,min}).$$

Figure 3:
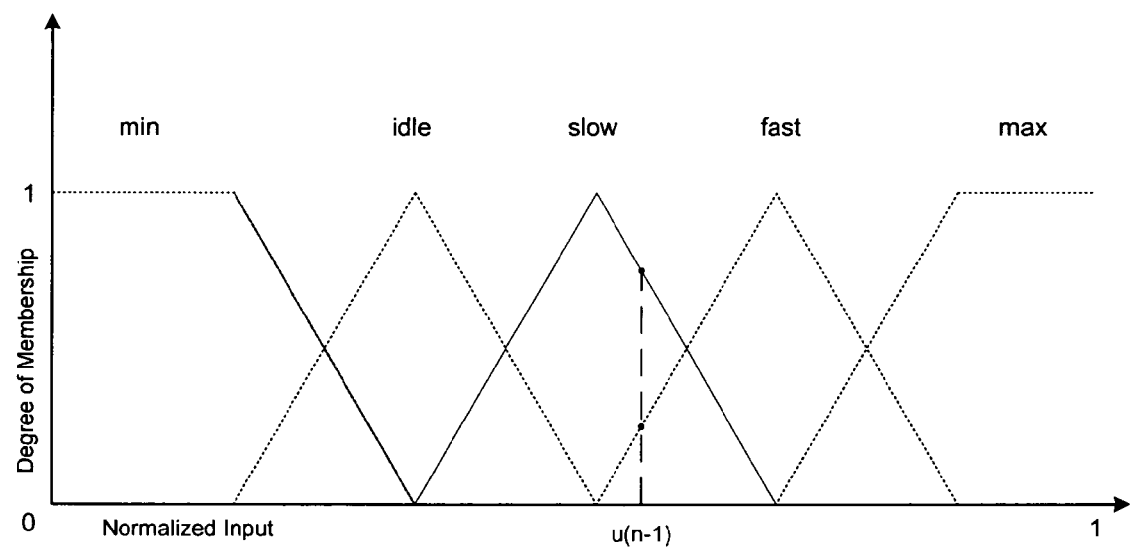
FIG. 3 illustrates fuzzification of input variables according to some embodiments.

The normalized variables are fuzzified at 220. Any system for fuzzification that is or becomes known may be used in some embodiments of 220. Some embodiments employ triangular, properly-overlapped membership functions for each input and Takagi-Sugeno fuzzy inference. FIG. 3 is a graph illustrating five triangular membership functions that may be used to fuzzify the normalized fan speed inputs of the present example.

Next, at 230, fuzzy reasoning models are created based on observation vectors and a fan control parameter vector. According to some embodiments, the normalized environment variables at instant k delayed by d samples (i.e., $x_1(k-d)$ and $x_2(k-d)$) become the inputs to the fuzzy system.

The i-th fuzzy reasoning model may therefore become:

$$R_i: \text{IF } x_1(k-d) \in X_1 \text{ AND } x_2(k-d) \in X_2 \text{ THEN } y_i(k) = A_i(q^{-1})y(k) + B_i(q^{-1})u(k),$$

where $X_1$ and $X_2$ are fuzzy sets corresponding to the aforementioned membership functions. $y_i(k+1)$ is a one-instant-ahead value of junction temperature $T_j$ of the device to be managed as predicted by the i-th model defined by $A_i(q^{-1})$, $B_i(q^{-1})$. The polynomials $A(q^{-1}) = a_1 q^{-1} + a_2 q^{-2} + \ldots + a_n q^{-n}$ and $B(q^{-1}) = b_0 + b_1 q^{-1} + b_2 q^{-2} + \ldots + b_{m-1} q^{-m+1}$ represent a linear model, with $q^{-1}$ being a delay operator. y(k) is an observation vector of present and past values of the measured junction temperature $T_j$, and u(k) is an observation vector of present and past values of the measured power consumption.

Hence, the consequent of the i-th rule can be rewritten as:

$$y_i(k) = A_i(q^{-1})y(k) + B_i(q^{-1})u(k)$$
$$= a_{1,i}T_j(k-1) + a_{2,i}T_j(k-2) + \ldots + a_{n,i}T_j(k-n) +$$
$$b_{0,i}u(k) + b_{1,i}u(k-1) + b_{2,i}u(k-2) + \ldots + b_{m-1,i}u(k-m+1).$$

The foregoing elements of process 200 may be executed during design and/or testing of a platform in which the remaining elements of process 200 are to be executed. Accordingly, the platform itself might not execute any of the foregoing elements in some embodiments.

Determination of temperature $y_i(k)$ for each of the i models requires the present and past values that comprise observation vectors y(k) and u(k). Accordingly, at 240, observation vectors are constructed using previously detected and stored samples indicative of device power consumption and device temperature. The samples indicative of device power consumption may comprise any signal correlated with active power. For example, the data samples include activity factors or signals derived from hardware performance counters.

Temperature sensors such as thermal diodes and/or digital thermometers may be employed to obtained the temperature samples used to construct observation vector y(k). In some embodiments of 240, the samples are obtained by superimposing a power trace that has rich frequency content in the range of interest (e.g., a pseudo-random binary sequence) on the operational load of the device.

An estimated temperature is determined based on the fuzzy reasoning models at 250. For example, an estimated temperature at instant k may be obtained by combining the estimates from the local models as follows:

$$y(k) = \Sigma_{i=1,N}\{(A_i(q^{-1})y(k) + B_i(q^{-1})u(k))w_i(x_1,x_2)\},$$

where the weights $w_i$ must satisfy the condition $\Sigma_{i=1,N} w_i = 1$. The weights $w_i$ represent the validity of each model based on the degree of membership of the fuzzy input variables.

Next, an error is determined based on the estimated temperature and on an actual measured temperature. The actual temperature may be measured at substantially instant k by any suitable system that is or becomes known. Generally, the error may be given by:

$$e(k) = T_j(k) - y(k).$$

Figure 1:
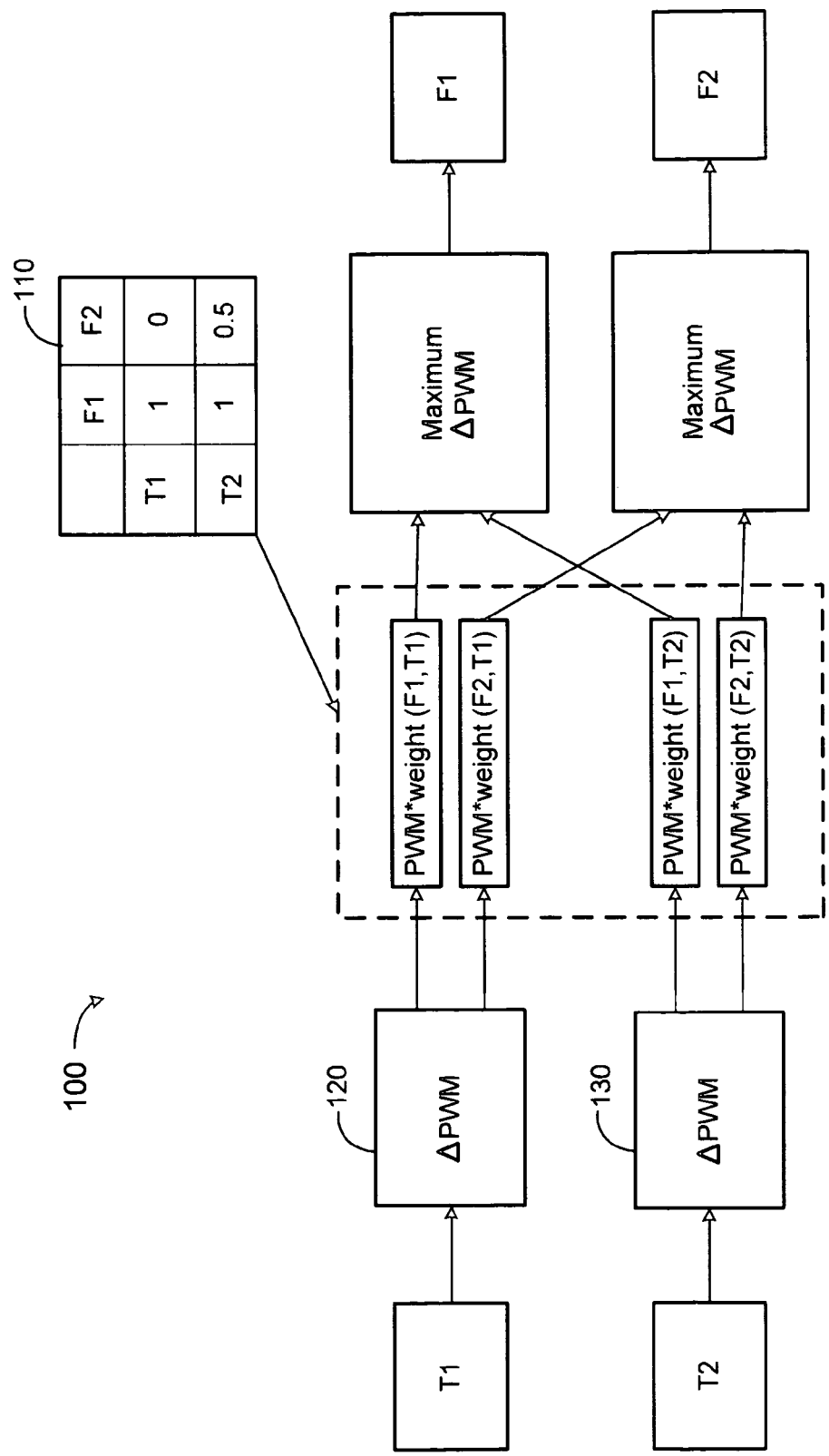
FIG. 1 is a block diagram illustrating a system according to some embodiments.

At 270, it is determined whether the error is less than threshold value. If so, flow pauses at 280 before returning to 240 and continuing as described below. An error that is less than the threshold value therefore indicates that the fan control parameter vector does not require adaptation. Accordingly, the fan control parameter vector may be used during the pause at 280 to populate a weighing matrix of a fan control system such as system 100 of FIG. 1. The pause at 280 may be of any duration deemed suitable for retesting the suitability of the fan control parameter vector.

Flow proceeds to 290 if the error is greater that the threshold value. The fan control parameter vector is adapted at 290 using a recursive least squares parameter adaptation algorithm. Any suitable such algorithm may be employed at 290.

Continuing with the present example, the fan control parameter vector may be defined as $\theta = (a_{1,1} \ldots a_{n,1} b_{1,1} \ldots b_{m,1} a_{1,2} \ldots a_{n,2} \ldots b_{1,N} \ldots b_{m,N})$ by combining all the parameters of the fuzzy models and the information vector $\phi(k) = (w_1 T_j(k-1) \ldots w_1 T_j(k-n) w_1 u(k) \ldots w_1 u(k-m-1) w_2 T_j(k-1) \ldots w_2 T_j(k-n) w_2 u(k) \ldots w_2 u(k-m-1) \ldots w_N u(k-m-1))$ in a similar way. The predicted temperature can therefore be expressed as $y(k) = \sigma^T \phi(k)$, where T is the transpose operator.

The fan control parameter vector σ is then adapted at 290 using a least squares algorithm that provides stability and convergence. For example, using the Extended Least Squares algorithm, the adaptation algorithm corresponds to:

$$\theta(k+1) = \theta(k) + F(k)\phi(k)e(k+1),$$

$$F(k+1) = F(k) - F(k)\phi(k)\phi^T(k)F(k)/(1+\phi^T F(k)\phi(k)),$$

$$e(k+1) = (T(k+1) - \theta^T(k)\phi(k))/(1+\phi^T F(k)\phi(k)).$$

Figure 4:
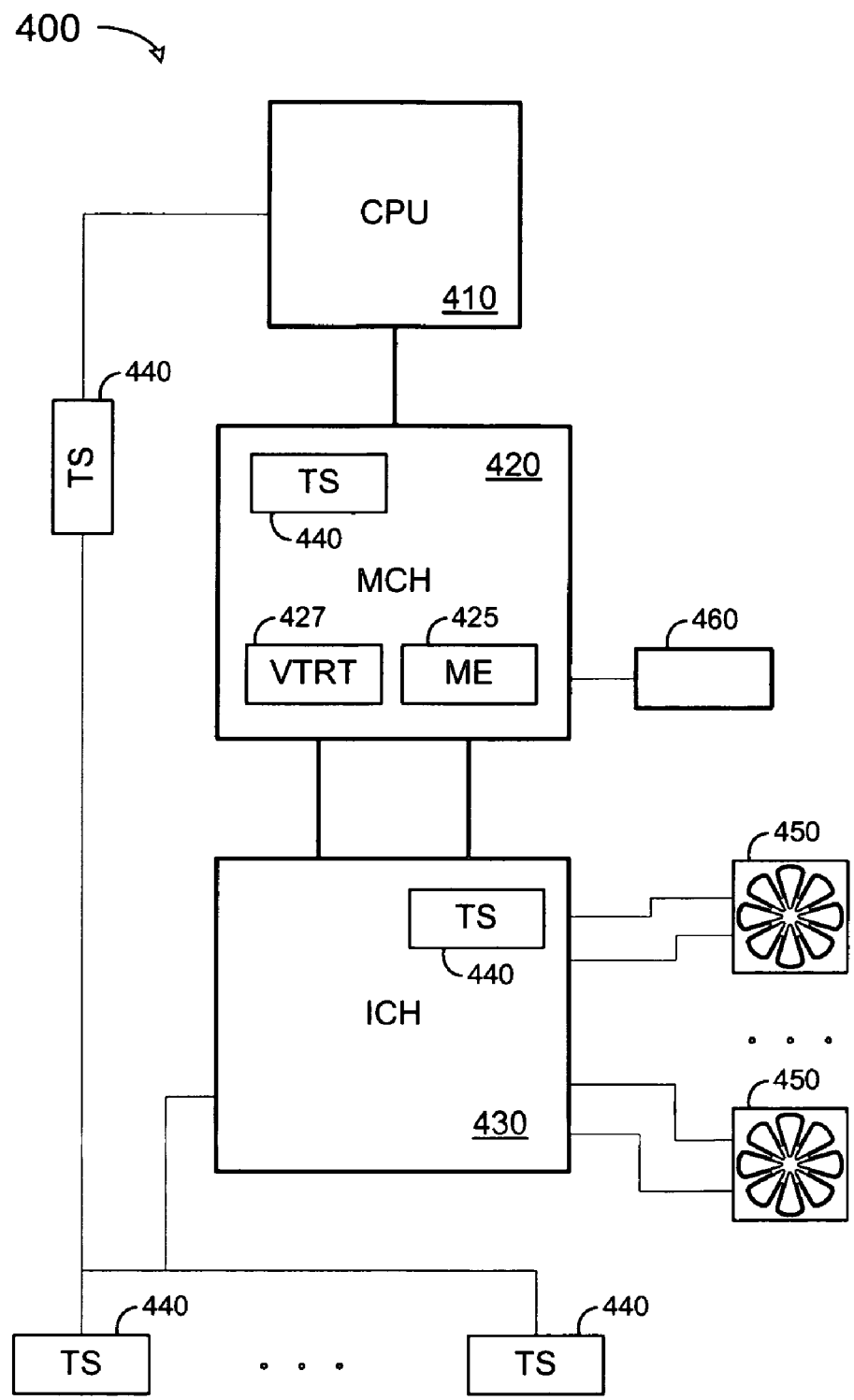
FIG. 4 is a block diagram of a system according to some embodiments.

FIG. 4 is a block diagram of a system to implement at least 240-290 of process 200 according to some embodiments. System 400 includes CPU 410, which may correspond to the device of interest in the previous example. CPU 410 is in communication with Memory Controller Hub 420 over a front side bus and with I/O Controller Hub 430 over a Platform Environment Control Interface. Thermal sensors 440 may measure temperatures as described above and provide the measured temperatures via Simple Serial Transport to management engine 425 of MCH 420.

MCH 420 also includes virtual thermal relationships table 427 for storing fan control parameters (i.e., a fan control parameter vector) according to some embodiments. Management engine 425 may execute any algorithm to generate control signals based on the stored parameters and to issue the control signals to ICH 430 via a Controller Link. ICH 430 may then control fans 450 based on the control signals.

Memory 460 is in communication with MCH 420 and may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The several embodiments described herein are solely for the purpose of illustration. Therefore, persons in the art will recognize from this description that other embodiments may be practiced with various modifications and alterations.

What is claimed is:

1. A method comprising:
   constructing observation vectors based on a plurality of power samples indicating past power consumption of a device and a plurality of temperature samples indicating past and present values of temperatures of the device;
   determining an estimated temperature of the device based on fuzzy reasoning models comprising the observation vectors and a fan control parameter vector;
   measuring a temperature of the device;
   determining an error based on the estimated temperature and the measured temperature; and
   adapting the fan control parameter vector using a recursive least squares algorithm based on the error.

2. A method according to claim 1, further comprising:
   fuzzifying a plurality of variables related to the device temperature,
   wherein the fuzzified plurality of variables comprise inputs to the fuzzy reasoning models.

3. A method according to claim 2, further comprising:
   normalizing the plurality of variables prior to fuzzifying the plurality of variables.

4. A method according to claim 1, wherein the plurality of variables comprise speeds of the fans.

5. A method according to claim 4, wherein the plurality of variables comprise an ambient temperature.

6. An apparatus comprising:
   a temperature device to measure a temperature of a device;
   a chipset to:
      construct observation vectors based on a plurality of power samples indicating past power consumption of the device and a plurality of temperature samples indicating past and present values of temperatures of the device measured by the temperature device;
      determine an estimated temperature of the device based on fuzzy reasoning models comprising the observation vectors and a fan control parameter vector;
      determine an error based on the estimated temperature and a temperature measured by the temperature device; and
      adapt the fan control parameter vector using a recursive least squares algorithm based on the error.

7. An apparatus according to claim 6, the chipset further to:
   fuzzify a plurality of variables related to the device temperature,
   wherein the fuzzified plurality of variables comprise inputs to the fuzzy reasoning models.

8. An apparatus according to claim 7, the chipset further to: normalize the plurality of variables prior to fuzzifying the plurality of variables.

9. An apparatus according to claim 6, wherein the plurality of variables comprise speeds of the fans.

10. An apparatus according to claim 9, wherein the plurality of variables comprise an ambient temperature.

11. A system comprising:
   a double data rate memory;
   a temperature device to measure a temperature of the memory; and
   a chipset to:
      construct observation vectors based on a plurality of power samples indicating past power consumption of the memory and a plurality of temperature samples indicating past and present values of temperatures of the memory measured by the temperature device;
      determine an estimated temperature of the memory based on fuzzy reasoning models comprising the observation vectors and a fan control parameter vector;
      determine an error based on the estimated temperature and a temperature measured by the temperature device; and
      adapt the fan control parameter vector using a recursive least squares algorithm based on the error.

12. A system according to claim 11, the chipset further to:
fuzzify a plurality of variables related to the device temperature,
   wherein the fuzzified plurality of variables comprise inputs to the fuzzy reasoning models.

13. A system according to claim 12, the chip set further to:
normalize the plurality of variables prior to fuzzifying the plurality of variables.

14. A system according to claim 11, wherein the plurality of variables comprise speeds of the fans.

15. A system according to claim 14, wherein the plurality of variables comprise an ambient temperature.

16. A system according to claim 11, the chipset further to:
control the fans based on the fan control parameter vector.

17. A method according to claim 1, wherein determining an error based on the estimated temperature and the measured temperature is calculated by $e(k)=T_j(k)-y(k)$ where $e(k)$ is the error, $T_j(k)$ is a temperature associated with the device and $y(k)$ is an observation vector associated with the temperature associated with the device.

18. An apparatus according to claim 6, wherein determining an error based on the estimated temperature and the measured temperature is calculated by $e(k)=T_j(k)-y(k)$ where $e(k)$ is the error, $T_j(k)$ is a temperature associated with the device and $y(k)$ is an observation vector associated with the temperature associated with the device.

19. A system according to claim 11, wherein determining an error based on the estimated temperature and the measured temperature is calculated by $e(k)=T_j(k)-y(k)$ where $e(k)$ is the error, $T_j(k)$ is a temperature associated with the device and $y(k)$ is an observation vector associated with the temperature associated with the device.

* * * * *